May 6, 1930. D. W. R. MORGAN 1,756,987
HEAT BALANCE CONDENSING PLANT
Filed March 30, 1927   2 Sheets-Sheet 1

INVENTOR
D.W.R.Morgan
BY
a. B. Reavis
ATTORNEY

May 6, 1930.  D. W. R. MORGAN  1,756,987
HEAT BALANCE CONDENSING PLANT
Filed March 30, 1927   2 Sheets-Sheet 2

INVENTOR
D.W.R. Morgan
BY
A. B. Reavis
ATTORNEY

Patented May 6, 1930

1,756,987

UNITED STATES PATENT OFFICE

DAVID W. R. MORGAN, OF SWARTHMORE, PENNSYLVANIA, ASSIGNOR TO WESTINGHOUSE ELECTRIC & MANUFACTURING COMPANY, A CORPORATION OF PENNSYLVANIA

HEAT-BALANCE CONDENSING PLANT

Application filed March 30, 1927. Serial No. 179,625.

My invention relates to power plants, and especially to industrial power plants, in which it often occurs that the main unit steam converted into power represents only a fraction of the total station boiler capacity, due, for instance, to the fact that steam for other purposes, such as for process work, is extracted, after partial expansion, as from the various stages of a turbine.

Under conditions like these, where an appreciable quantity of boiler feed make-up water may be continually required, this make-up water may be economically introduced into the system as cooling media through the jets of a jet condenser for condensing steam exhausted from the main units. If desired, this make-up feed water may also be introduced through a surface condenser as cooling media, or the surface and the jet condensers may be combined and arranged to cooperate in such a way as to introduce the make-up water with a temperature very near to that of exhaust steam. Such an arrangement has the advantage that it makes the latent heat of condensation of the exhaust steam available for heating the boiler feed, make-up water.

Apparatus, embodying, among others, the features thus far discussed, is disclosed and claimed in the patent of John H. Smith; No. 1,675,471, filed October 30, 1926; and assigned to the Westinghouse Electric and Manufacturing Company. Accordingly, therefore, I make no claim to the subject matter of that application.

An object of my invention is to provide a heat balance condensing plant, of the type described, which shall include means for so controlling the admission of motive fluid to a surface condenser, that a jet condenser, associated therewith, may always receive the proper amount of exhaust steam for heating make-up feed water passing through the jets of the jet condenser.

Another object of my invention is to provide means for removing air and non-condensable gases from a combined surface and jet condensing apparatus.

Another object is to provide means for permitting liquid media to flow from various portions of apparatus of the class described, in which different conditions of temperature and pressure may prevail, while maintaining these respective conditions.

A further object of my invention is to provide a condensing plant of the type described which shall require minimum space, and which shall be inexpensive to manufacture.

Other and further objects of my invention will appear as the description proceeds.

Apparatus embodying the features of my invention is shown in the accompanying drawings, in which.

According to my invention, surface and jet condensing apparatus are combined so as to receive motive fluid discharged from a prime mover, such as a turbine, and means are provided for directing motive fluid to the jet condensing portion of my apparatus, or for permitting such motive fluid to pass into the surface condensing portion as well as into the jet condensing portion. Means are also provided for supplying the jet condensing apparatus with make-up water suitable for boiler feed purposes, and my apparatus is so arranged that untreated water, which would be unsuitable for boiler feed purposes, may be used as cooling media for the tubes of the surface condensing apparatus. Means are also provided for returning the liquid aggregate from the hotwell of my combined condensing apparatus to a steam generator, and means are also provided for maintaining the proper conditions of temperature and pressure in different portions of my combined surface and jet condensing apparatus.

Figure 1:
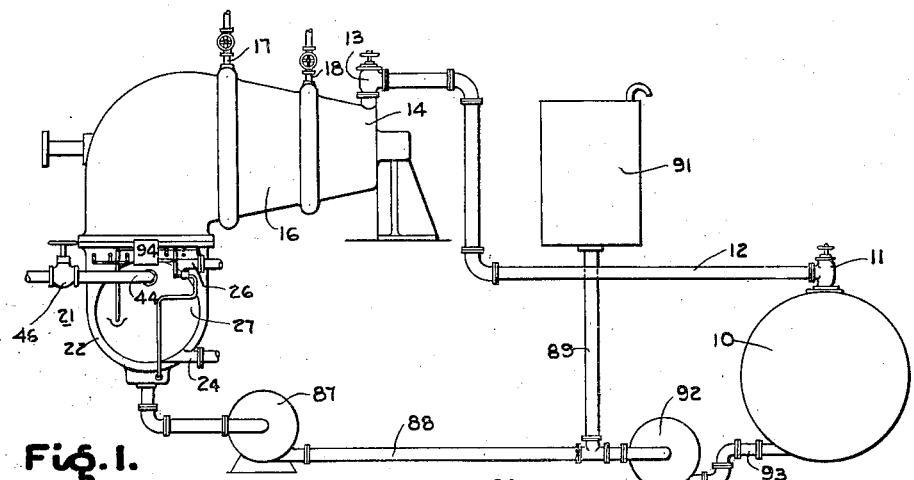
Fig. 1 is a diagrammatic view of power plant apparatus embodying my invention.

In Fig. 1, I show a steam generator 10, provided with a suitable valve 11 for admitting steam, or other motive fluid, to a line 12, through which it passes to a throttle valve 13 on the steam chest 14, of a prime mover, such as the turbine 16. Suitable connections, such as 17 and 18, are provided for extracting steam from the turbine, after partial expansion, for process work, or the like. The steam so extracted is normally not condensed and returned to the power system.

Associated with the turbine 16 is a combined surface and jet condenser apparatus, at 21, comprising a shell 22, having a motive fluid inlet 23, and circulating water connections 24 and 26, which are preferably in one water box, as, for example, in water box 27. The water box 28, associated with the other end of the shell, serves merely to return cooling media through the nest.

A longitudinally disposed nest of tubes 29 is arranged within the shell and is preferably divided so as to form a steam lane 31, which is in direct communication with the motive fluid inlet 23. This lane is preferably defined by longitudinally extending partition means, such as plates 32 and 33. These plates extend above the tube nest and have flanges 34 and 36 along their upper edges for a purpose to be described later.

Extending longitudinally through this lane between the plates 32 and 33 and, preferably, in the region adjacent the motive fluid inlet, is a conduit 37 for introducing make-up feed water. This conduit 37 extends between tube sheets 38 and 39, which are associated with the respective ends of the nest of tubes.

This conduit 37 is provided with a series of nozzles 41, for introducing feed water into the steam lane 31 in the form of a spray. Any suitable means may be provided for taking care of the expansion and contraction of the conduit 37, such, for example, as the expansion joint shown at 42.

One end of the conduit 37 is closed by the tube sheet 38, while a suitable opening is provided in the tube sheet 39 to form a direct passage through the conduit 37, the tube sheet 39 and the connection 43, through the water box 27, to an exterior connection 44, which latter may include any suitable means for controlling the admission of fluid to the conduit, such, for example, as the valve 46.

Disposed longitudinally of the partition means 32 and 33, and at a suitable distance below the nozzles 41 of the conduit 37, are sections 47 and 48, which may be in the form of flanged plates so arranged as to provide a rounded converging surface such as shown at 49 for causing liquid media to pass thereover in a relatively thin sheet.

A hotwell 51 is provided for receiving condensate from the shell of the surface condenser portion of my apparatus, and is, also, preferably arranged to receive media discharged between the converging members 47 and 48. This hotwell is fully described in my former Patent No. 1,578,058, dated March 23, 1926, and, therefore, will only be briefly referred to here.

The hotwell 51 comprises an exterior shell portion 52 having an integral concentric partition 53, and preferably concentrically arranged within this partition, is a cup 54. This cup is supported from the circular wall 53 by any suitable means, such as webs 56. A connection 61, having a rounded entrance, extends into the cup 54, and is supported on the upper surface of the hotwell, from which the partitions 57 and 58 depend, so as to form a water seal between the chamber formed between concentric members 53 and the inlet ports 59 for condensate from the surface condenser. The connection 61 is preferably arranged directly below the opening between the flanged members 47 and 48.

Means are also provided for removing air and other non-condensable gases from my combined surface and jet condensing apparatus. In the form shown, these means comprise relatively narrow rectangular boxes 60 extending longitudinally through the lower portion of the nest.

These boxes are formed by plates 62 and 63, which are preferably parallel to the partitions 32 and 33, and are flanged along their upper edges as at 64 and 66. These flanges are secured to the partition members 32 and 33 by any suitable means, such as by angles 67 and 68. The members 62 and 63 may be secured to the shell by any suitable means such as angles, or the like 62' and 63'.

Disposed in the walls formed by the members 62 and 63, are ports such as 71 for receiving air and non-condensable gases from the tube nest 29. Ports 72 are also provided in the partition members 32 and 33 for permitting air and non-condensable gases to pass from the steam lane 31 into the compartments formed by the partition members and the members 62 and 63.

The ports 72 are preferably arranged at the upper portion of the air boxes, and above the discharging edges of the members 47 and 48, so as to provide a proper arrangement for removing gaseous media from liquid passing over the members 47 and 48.

Figure 5:
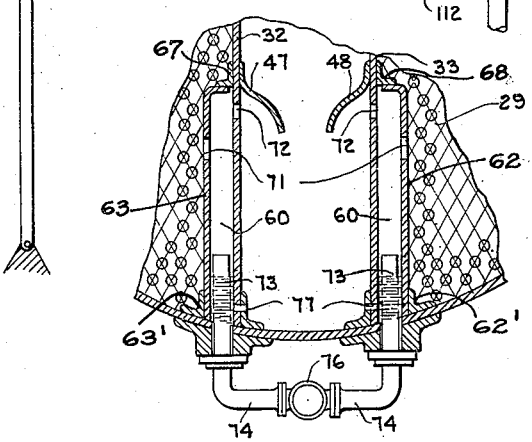
Fig. 5 is a sectional view taken along the line V—V of Fig. 2.
Figure 4:
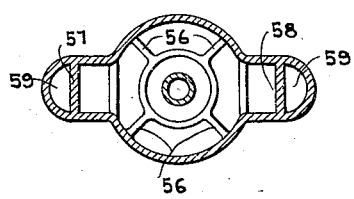
Fig. 4 is a sectional view taken along the line IV—IV of Fig. 3.
Figure 3:
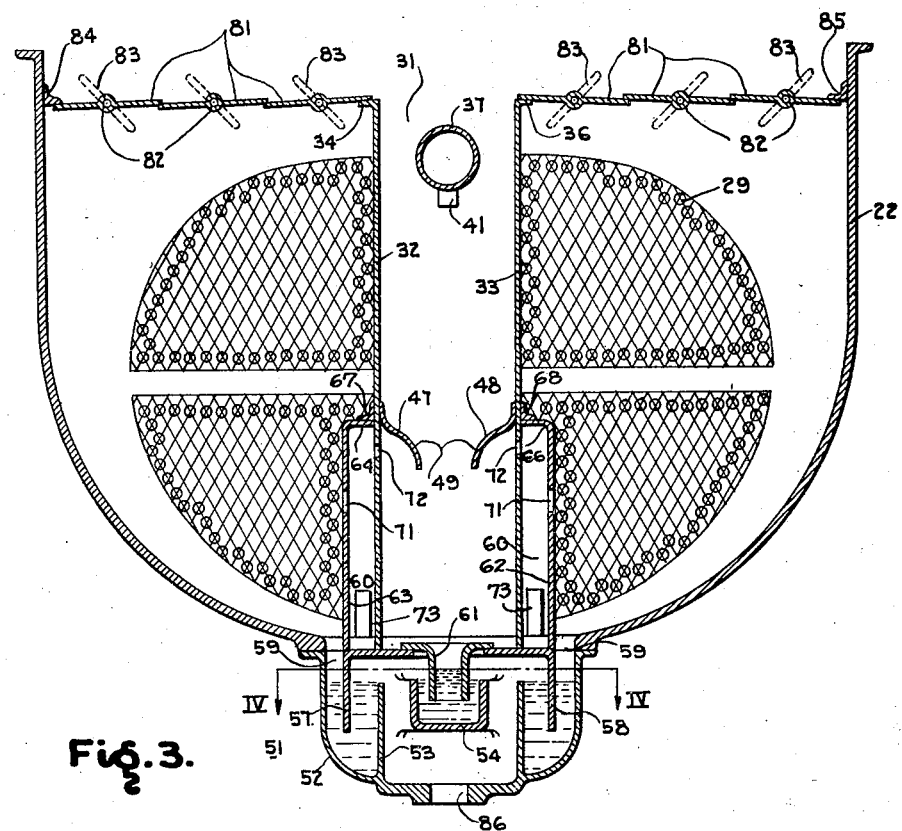
Fig. 3 is a sectional view taken along the line III—III of Fig. 2.
Figure 2:
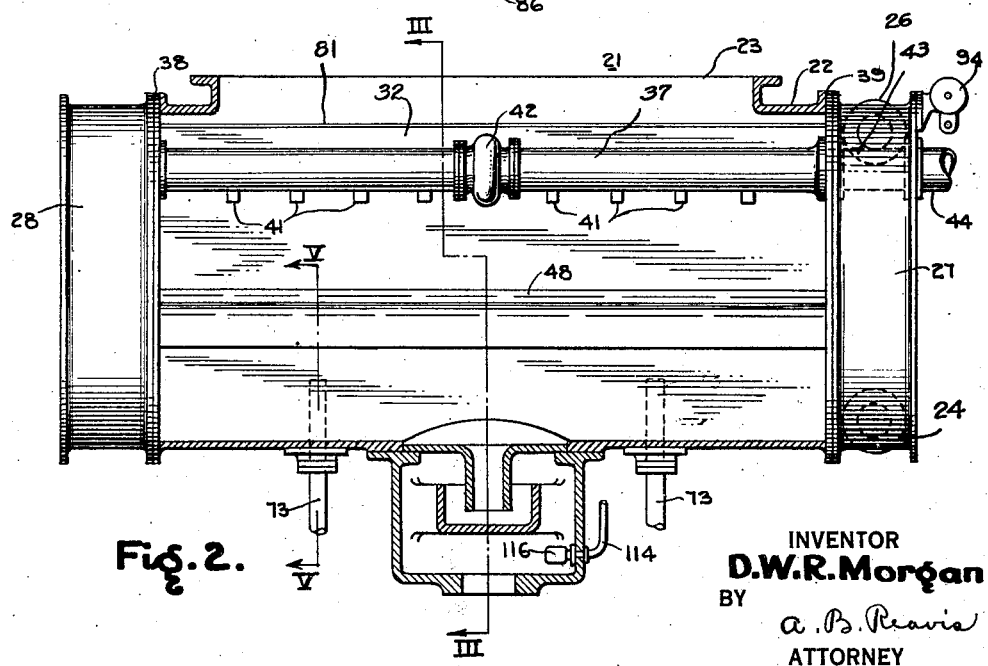
Fig. 2 is a sectional view of the combined jet and surface condensing apparatus shown in Fig. 1.

Disposed at suitable points along the shell are connections 73, which extend into the above-mentioned air boxes and are connected by suitable connections, such as 74, with a conduit 76, which leads to any suitable air removal apparatus (not shown). Suitable openings, such as 77, are disposed in the walls 32 and 33 closely adjacent the shell 22. It will be noted that the connections 73 extend into the respective air boxes above these openings or drains 77, so as to prevent condensate from entering the air removal apparatus 74. As shown in Fig. 5, the level of the condensate in the air boxes 60 will normally be above the openings 77 because of the pressure in the air boxes 60 being lower than the pressure in the steam lane or jet condensing space 31 due to the air boxes 60 being located closer to the air removal apparatus.

Disposed between the respective partition members 32 and 33 and the shell 22, are directing means, or guide vanes 81. These vanes are pivotally mounted on pivotal members, such as rods 82, which extend longitudinally of the shell, and suitable means, such as levers 83, are secured to these rods in some position outside of the condenser to provide means for operating the vanes 81.

The vanes may be arranged so as to be balanced open, or in a vertical position, so as not to interfere with the admission of motive fluid to the tube nest 29 of the surface condensing portion of my apparatus. By operating the handles 83, the vanes may be either partially or wholly closed, so as to form a closed partition between the flanges 34 and 36 of members 32 and 33 respectively, and the shell 22.

If desired, abutment means, such as angles 84 and 85, may be provided on the shell for effectively closing off the surface condensing portion of my apparatus. I may also connect chains (not shown) to the ends of the respective handles 83, so that the vanes 81 may be conveniently manipulated from the lower portion of my apparatus, or from any desired control panel.

Figure 6:
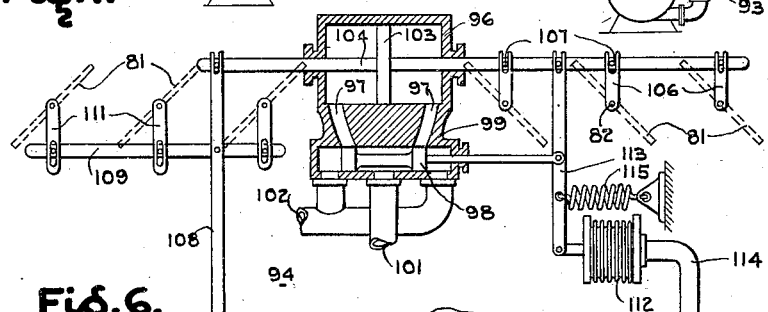
Fig. 6 is a diagrammatic view of a portion of the apparatus shown in Fig. 1.

Preferably, however, I provide a fluid-pressure relay 94 (Fig. 6) for operating the vanes 81 in response to changes in temperature of the condensate in the hotwell 51. This relay comprises a cylinder 96 having ports 97 for the admission and discharge of an actuating medium. The flow through the ports 97 is controlled by a valve 98 which is adapted to reciprocate in the valve chest 99. The latter is provided with an inlet connection 101 and with discharge connections 102.

A piston 103, in the cylinder 96, is secured on the rod 104, the latter being adapted to actuate the vanes 81, on the right side as shown in the drawing, by means of arms 106 which are secured to the rods 82, and which engage suitable abutments 107 on the rod 104. The vanes, on the left, are actuated through a pivoted lever 108, which acts through a pivotally connected link 109 to actuate the depending arms 111 of the rods 82. The arms 111 are, preferably, made slightly longer than the arms 106 in order to obtain equal adjustments of all the vanes for corresponding movements of the piston 103.

The piston rod 104, the valve 98, and an expansible bellows 112 are pivotally connected to the link 113. The expansible bellows 112 is connected by means of the tube 114 with an otherwise closed vessel 116 in the hotwell 51. A suitable spring 115 may be provided for assisting the bellows in moving the link 113 when the bellows is contracting.

In the operation of the relay mechanism, any suitable medium which will expand and contract in response to changes in temperature over the range of temperatures desired, is introduced into the vessel 116, the tube 114, and the bellows 112. The inlet connection 101 is connected to any suitable source of fluid under pressure.

Any rise in temperature of the condensate in the hotwell 51 causes the actuating medium in the vessel 116 to expand and, consequently, the bellows 112 expand. The bellows acts upon the link 113 to open the valve 98 which remains open until the piston 103 has moved the proper distance to adjust the vanes to correct the temperature in the hotwell, by allowing more steam to pass to the surface condensing portion of the condenser. On a decrease in temperature, the reverse operation takes place, with the result that the vanes 81 are always correctly adjusted.

The means for removing the condensate aggregate from the hotwell 51 comprise a condensate removal pump 87, which is connected to the opening 86 of the hotwell 51. The pump 87 discharges into a line 88, which is connected by connection 89 with the surge tank 91. A boiler feed pump 92 receives media from the line 88 and passes it into the boiler 10 through suitable connections, which may include a check valve 93.

In the operation of the condensing portion of my apparatus, the reduced pressure and temperature within the air boxes 60 causes condensate to remain in the lower portions of these chambers to a lever which is below the air removal connections 73, and is above the openings or drains 77 in the lower portions of the walls 32 and 33.

Due to the construction of my hotwell, liquid seals are provided between the surface condensing portion of my apparatus and the hotwell, and also between the jet condensing portion and the hotwell.

During normal full load operation, raw water may be used as cooling media in the surface condensing tubes, and water suitable for boiler feed purposes may be passed through the jets 41 of the conduit 37. As fluctuations in load occur, the vanes 81 may be manipulated so as to keep the jet condensing portion of my apparatus operating to capacity, while relieving the surface condensing portion of its normal load. In this way, the introduction of the requisite amount of feed water, through the jets 41 of conduit 37, is made possible under the various conditions which may exist in a plant of the type described.

It will also be noted that, while I have combined a surface and a jet condenser, my condensing apparatus is very compact and requires no more head room than the ordinary surface condenser.

While I have shown my invention in one form, it will be obvious to those skilled in the art that it is not so limited, but is susceptible of various changes and modifications, without departing from the spirit thereof, and I desire, therefore, that only such limitations shall be placed thereupon as are imposed by the prior art or as are specifically set forth in the appended claims.

What I claim is:

1. A condensing plant comprising a shell structure having an inlet for gaseous media to be condensed, a tube nest within the shell structure and forming a surface condensing element, means for conveying extraneous cooling water through the tube nest, means for spraying make-up water to be heated into a portion of the shell structure which is separate from the portion containing the surface condensing element and which is in the path of the gaseous media entering the shell structure, said separated portion of the shell structure forming a jet condensing element, and means for commingling all of the condensate formed by the surface and jet condensing elements and the heated make-up water derived from the jet condensing element.

2. Condensing apparatus as claimed in claim 1 wherein a hotwell structure is provided for commingling the condensate formed by the surface and jet condensing elements and the heated make-up water derived from the jet condensing element.

3. In a surface condenser comprising a shell having a motive fluid inlet, a nest of tubes within the shell, and a hotwell for receiving condensate from the shell, the combination of one or more jet condensers within the shell and arranged to receive motive fluid directly from said motive fluid inlet and to discharge into said hotwell, and intercepting means for diverting any amount of the motive fluid which normally passes to the surface condenser to the jet condensers.

4. In a surface condenser comprising a shell having a motive fluid inlet, a nest of tubes within the shell, and a hotwell for receiving condensate from the shell, the combination of one or more jet condensers within the shell and arranged to receive motive fluid directly from said motive fluid inlet and to discharge into said hotwell, an air and non-condensable gas offtake within the shell for removing air and non-condensable gases from the surface and the jet condensers, and intercepting means for diverting any amount of the motive fluid which normally passes to the surface condenser to the jet condensers.

5. In combination, a surface condenser, one or more jet condensers within the surface condenser, a hotwell for the respective surface and the jet condensers, and means providing a liquid seal between the respective condensers and the hotwell.

6. In combination, a surface condenser, one or more jet condensers within the surface condenser, a hotwell for the respective surface and the jet condensers, and separate means providing a liquid seal between the respective condensers and the hotwell.

7. In combination, a surface condenser, one or more jet condensers within the surface condenser, and means between the respective jet condensers and the surface condenser providing an air and non-condensable gas offtake for the surface condenser.

8. In combination, a surface condenser, one or more jet condensers within the surface condenser, and means between the respective jet condensers and the surface condenser providing an air and non-condensable gas offtake for the jet condensers.

9. In combination, a surface condenser, one or more jet condensers within the surface condenser, and means between the respective jet condensers and the surface condenser providing an air and non-condensable gas offtake for the surface and the jet condensers.

10. In combination, a surface condenser, one or more jet condensers within the surface condenser, a hotwell for the respective surface and the jet condensers, means providing a liquid seal between the respective condensers and the hotwell, means between the respective jet condensers and the surface condenser providing an air and non-condensable gas offtake therefor, and means providing a liquid seal between the air and non-condensable gas offtake and the hotwell.

11. A condensing plant comprising a shell structure having an inlet for gaseous media to be condensed, a surface condensing element disposed within the shell structure, a jet condensing element disposed within the shell structure, and adjustable means for apportioning the amount of gaseous media passing to the surface condensing element.

12. In combination, a surface condenser, one or more jet condensers within the surface condenser, means providing a hot well for the jet and surface condensers, and means providing separate liquid seals between the hot well and the surface and jet condensers, respectively.

13. In combination, a surface condenser, one or more jet condensers within the surface condenser, a common hot well for both the surface and jet condensers, and means embodied in the hot well for providing separate liquid seals between the surface and jet condensers, respectively, and the hot well.

14. In combination, a surface condenser embodying a tube nest composed of two separated portions, a jet condenser disposed within the surface condenser between the separated portions of the tube nest, a common hot well for both the jet and surface condensers, means providing a liquid seal between the hot well and the jet condenser, and means providing separate liquid seals between the respective portions of the surface condenser and the hot well.

15. A plant for condensing steam comprising a jet condensing element for condensing a portion of the steam and a surface condensing element for condensing the remainder of the steam, means for supplying make-up water as a condensing fluid to the jet condenser, means for supplying extraneous cooling water to the surface condenser, and means responsive to the temperature of the commingled make-up water and condensate discharged from the condensing plant for apportioning the amount of steam supplied to the surface condensing element.

In testimony whereof, I have hereunto subscribed my name this 22nd day of March, 1927.

DAVID W. R. MORGAN.